Dec. 10, 1968    R. E. STILWELL    3,415,270
PORTABLE IRRIGATION APPARATUS
Filed Sept. 6, 1966
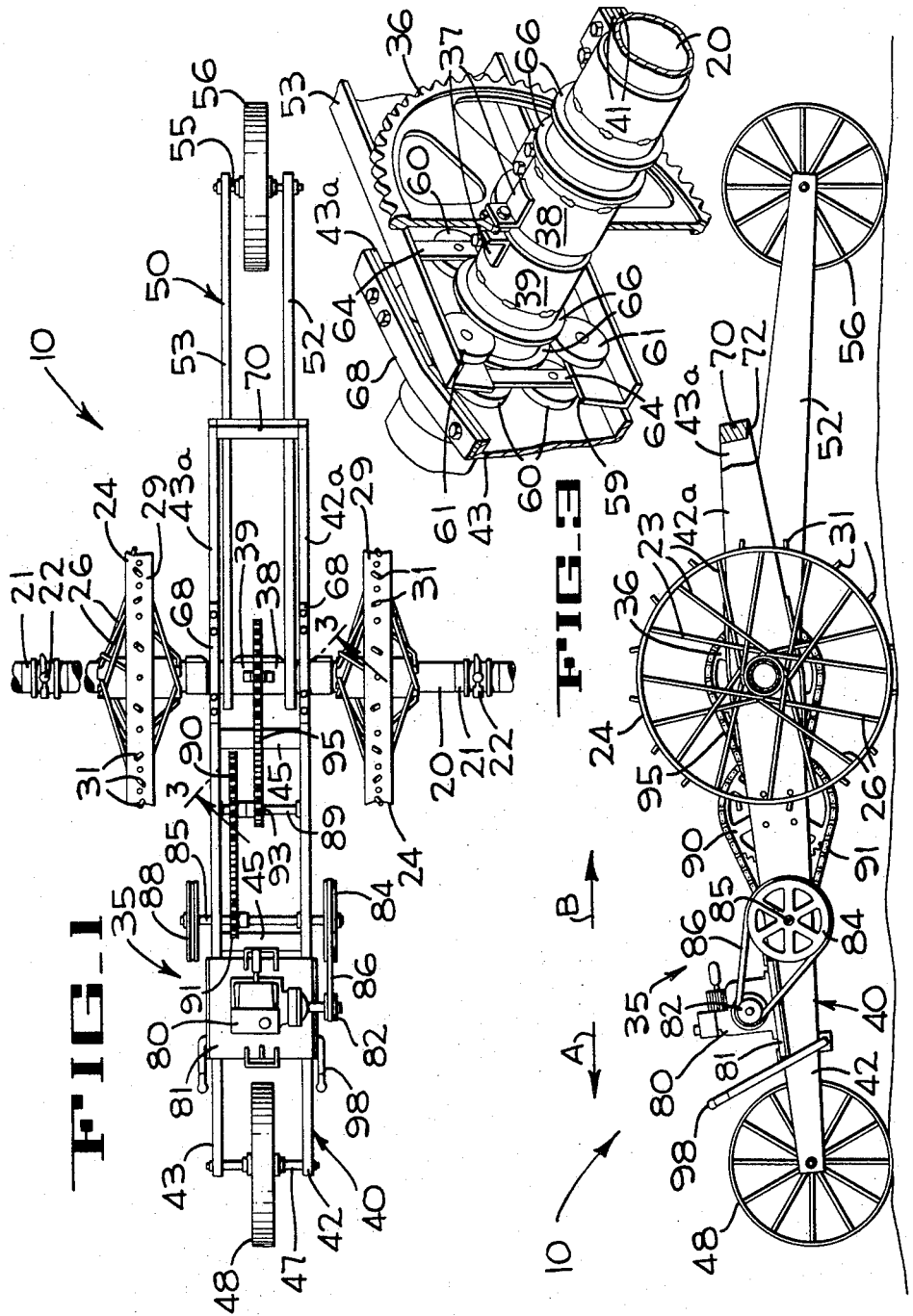
INVENTOR
ROBERT E. STILWELL
BY *Francis W. Anderson*
ATTORNEY

3,415,270
PORTABLE IRRIGATION APPARATUS
Robert E. Stilwell, Santa Clara, Calif., assignor to FMC Corporation, San Jose, Calif., a corporation of Delaware
Filed Sept. 6, 1966, Ser. No. 577,408
2 Claims. (Cl. 137—344)

The present invention pertains to portable irrigation apparatus and more particularly to a power drive unit for a wheel-mounted irrigation pipe.

The present invention is particularly concerned with improvements in the portable irrigation system disclosed in the patent to Stilwell et al., 2,892,466, which is assigned to the assignee of the present invention. The irrigation system shown and described in that patent generally comprises a pipe line which is elevated above the ground surface and is supported by a plurality of wheels rigidly attached about the pipe at suitably spaced intervals so that the line may be easily and rapidly moved over the ground surface of the fields to be irrigated. Irrigation water pumped through the pipe is applied to the fields through a series of sprinklers spaced along the length of the line. A power drive unit is provided for moving the system, which unit is mounted upon an elongated frame pivotally connected at its midpoint to the pipe line to extend laterally on both sides thereof. A reversible motor is mounted upon the frame to provide the power for moving the pipe line by applying a torque to the pipe, and ground engaging wheels are positioned at each of the transverse ends of the frame to provide reaction torque members which balance the driving torque of the motor.

In the present invention, the frame structure supporting the power drive unit is comprised of two individual frame members each being rotatably mounted upon the pipe line and extending laterally therefrom in opposite directions. The separate frame units of the present invention serve to relieve part of the dead weight load upon the pipe line during those periods when the line is in place and they help counteract the tendency for the pipe supporting wheels to become mired in the water-soaked fields. The provision of two separate frame members also promotes economy and efficiency in the servicing and repair of the power unit frame structure.

It is an object of the present invention to provide an improved portable irrigation apparatus for the rapid and efficient irrigation or sprinkling of large fields or the like.

Another object of the present invention is to provide an improved power unit for a portable irrigation system which is both economical in fabrication and efficient in operation.

These and other objects and advantages of the present invention will become more apparent from the following description and the accompanying drawings, in which:

FIGURE 1 is a fragmentary diagrammatic plan view of the portable irrigation apparatus of the present invention.

FIGURE 2 is a diagrammatic side elevation of the apparatus of FIGURE 1, with a portion thereof being broken away for the purpose of illustration.

FIGURE 3 is an enlarged fragmentary perspective of a portion of the apparatus shown in FIGURE 1, the view being taken looking in the direction of arrows 3—3 of FIGURE 1.

Referring now more particularly to the drawings, FIGURE 1 shows a portion of a portable irrigation system 10 including a pipe line 20 comprised of a plurality of lengths of pipe which are joined together by coupling members 21 at suitably spaced intervals along the length of the line. The coupling members include upstanding sprinkler heads 22 for distribution of the water in the pipe. Spoked wheels 24 are placed at appropriate intervals on the line and are rigidly attached to the outer surface of the pipe. The wheels generally comprise a plurality of spokes 26 which are affixed to a central hub 27 that is keyed to the pipe so that rotation of the pipe causes rotation of the wheels. The spokes extend radially outward and terminate in a flat-faced rim 29 which has a plurality of lugs 31 attached to its cylindrical exterior surface in order to give the apparatus the necessary traction for operation in water-soaked fields. For a further description relating to the details of the construction of the irrigation pipe line and its connecting and supporting structure, reference is made to the aforementioned Patent No. 2,892,466.

A power drive unit 35 is arranged to propel the irrigation pipe line 20 by applying a driving torque to a large gear 36 (FIG. 3) which is bolted to a pair of brackets 37 (one pair only shown in FIG. 3), which are welded to elongated steel collars 38 and 39 that are split along one side and have laterally projecting flanges 41 that tightly clamp the collars on the pipe in the manner disclosed in said patent. The drive unit is supported by a pivotable frame section 40 comprised of a pair of tapered channel members 42 and 43 which are spaced apart in opposed relationship by a series of transverse braces 45. The outwardly projecting ends of the channel members are joined by a shaft 47 that rotatably mounts a wheel 48 to support the frame section for travel over the ground surface.

A second frame section 50 comprised of two tapered channel members 52 and 53 is pivotally mounted on the pipe 20 between the channel members 42 and 43 and extends laterally of the pipe line in the opposite direction from the direction in which the frame section 40 extends. The channel members 52 and 53 are placed in opposed parallel relationship and the outermost ends thereof are connected by a shaft 55 which rotatably supports a ground engaging wheel 56 similar to the wheel 48 on the frame section 40.

Each of the channel members 42, 43, 52 and 53 is rotatably mounted upon the pipe line 20 by a relatively frictionless pivotal mounting, as shown in FIGURE 3. The web of each of the channel members is cut away as at 59 on channel 53 to provide a notch into which the pipe line is placed. Two pairs of rollers 60 and 61 are rotatably mounted on the inner face of the web of each of the channel members and are placed about the pipe line in free, rolling engagement with the outer surface of the collars 38 or 39. The pair of rollers 60 are closely vertically spaced and are mounted on a reinforcing strap 64 welded to the legs of the associated channel member at the base of the notch. The set of rollers 61 are placed on the opposite side of the pipe line from the rollers 60 in vertical alignment and are rotatably attached to the channel member after it is mounted on the pipe line. These rollers are removable so that the frame sections may be disconnected from the pipe line should they need servicing or repair. Welded to the outer surface of the steel collars 38 and 39 are two spaced sets of circumferential ribs 66 which abut the inner faces of the associated rollers and prevent the channel members from moving axially along the pipe line.

Channel members 42 and 43 include channel sections 42a and 43a, respectively, which are attached to the rotatably mounted end of the channel members by means of bolted metal straps 68 (FIG. 3). The channel sections 42a and 43a project in the opposite direction from the main body of the frame 40 and are connected at their outer ends by a torque reaction bar 70 having a flat lower face 72 arranged to be moved into flush engagement with the upper surfaces of the channel members 52 and 53 when the frame section 40 is rotated about the axis of the pipe line 20, as will be more fully explained hereinafter.

A prime mover such as a gasoline engine 80 provides the power for the drive unit 35 and is mounted to slidably rest upon the frame section 40 near the ground engaging wheel 48 near the outer end of section 40. A drive sheave 82, powered by the engine, drives a sheave 84 and a shaft 85 that is keyed to sheave 84 through a drive belt 86. The shaft 85 is rotatably mounted in the frame section so that its opposite ends project outwardly from the channel members 42 and 43 to provide mountings for the sheave 84 and for a similar sheave 88 at the opposite end thereof. The shaft 85, in turn, drives a second shaft 89 through a large gear 90 and a chain 91 which is trained thereabout. Also rigidly attached to the shaft 89 is a small gear 93 which drives a chain 95 that is trained about the drive gear 36 that is keyed to the pipe line 20. It will thus be seen that the rotation of the drive sheave 82 in a counterclockwise direction, as shown by the arrow in FIGURE 2, will rotate the drive gear 36 and pipe 20 in a counterclockwise direction and move the pipe line to the left, as indicated by the direction of the arrow A.

The engine 80 is mounted on a plate 81 that is slidably mounted upon the frame section 40, in the manner described in Stilwell et al. Patent 2,892,466 so that the drive belt 86 may be tightened upon the drive sheave 82 to apply the driving force to the pipe line. Actuating levers 98 are swingably mounted in the channels 42 and 43 and are arranged to move the plate 81 along the channels 42 and 43 to tighten or loosen the belt 86 and thus control the movement of the pipeline. When the handles 98 are pulled rearwardly or in the direction indicated by the arrow A, the drive belt is tightened to supply power to the drive gear 36, and the irrigation system will be moved in the direction of the arrow A. When it is desired to move the apparatus in the opposite direction, the drive belt 86 is removed from the sheave 84 and the engine 80 and the plate must be lifted and reversed in position upon the frame 40. The drive belt 86 is then connected between the drive sheave 82 and the sheave 88 on the opposite side of the frame section. In this position, movement of the handles 98 in the rearward direction (in the direction indicated by the arrow A) causes tightening of the drive belt upon the sheave 88 and results in transmission of the driving force to the gear 36 to propel the system to the right, or in the direction of the arrow B.

When the apparatus is operated in the arrangement shown in the drawings, there will be a counterclockwise torque upon the pipe section 20 to propel the system in the direction of the arrow A. Counterbalancing this driving force will be a torque upon the frame section 40 tending to rotate it in a clockwise direction. This rotation will be limited by the engagement of the counter torque bar 70 with the upper surfaces of the channel members 52 and 53 of the oppositely extending frame section 50. The unbalanced reaction force of the frame section 40 will thus be absorbed in the oppositely extending frame section 50 and transmitted to the tail wheel 56 which is in contact with the ground. During the reverse condition of the irrigation system, that is, when the apparatus is set to move the system in the direction of the arrow B, the pipe 20 will be rotated in the clockwise direction and the frame section 40 will tend to rotate in a counterclockwise direction so that the tail wheel 48 at the end thereof will absorb the force as it bears against the ground.

It will thus be seen that the present portable irrigation system presents an efficient and economical drive arrangement for a system for distributing irrigation water in the field. Since separate frame members are used on each side of the pipe line, they may be easily replaced or serviced should they become damaged during operation of the apparatus. It will also be noted that both of the tail wheels supporting the frame sections 40 and 50 are resting on the ground surface during the normal, standing position of the apparatus and absorbing the major weight of their associated frame sections. This is in contrast to the apparatus described in the aforementioned prior Patent 2,892,466 where part of the frame assembly is unsupported and its full weight must be borne by the pipe line during the standing position of the apparatus. It will therefore be appreciated that the tendency for the pipe line supporting wheels 24 to become mired in the wet ground during those long standing periods of the wheels will be lessened with the apparatus of the present invention.

Although the best mode contemplated for carrying out the present invention has been herein shown and described, it will be apparent that modification and variation may be made without departing from what is regarded to be the subject matter of the invention as set forth in the appended claims.

Having completed a detailed description of the invention so that those skilled in the art could practice the same, I claim:

1. A power drive unit for an irrigation pipe line that is supported above the ground surface by radially extending wheels, said drive unit comprising a first elongated frame unit rotatably mounted to said pipe line and extending transversely thereof and away from said line in a first direction, power means on said first frame unit for alternatively exerting torque on the pipe line in opposite directions to roll the pipe line over the ground, a second elongated frame unit rotatably mounted to said pipe line independently of said first frame unit and extending transversely thereof and away from said line in a second direction opposite to said first direction, ground engaging means on the laterally extending ends of each of said frame units to counteract the reaction torque exerted on said frame units by the power means, and means on said first frame unit for engaging said second frame unit for transmitting the reaction torque to said second frame unit when said pipe line is moved in said first direction.

2. A power drive unit for an irrigation pipe line as set forth in claim 1 wherein said means on said first frame unit for transmitting the reaction torque to said second frame unit comprises a reaction torque bar mounted upon said first frame unit on the side of said pipe line in said second direction so as to normally overlie said second frame unit, said torque bar being positioned so as to abut said second unit when said first frame unit is rotated about said pipe line.

References Cited
UNITED STATES PATENTS

| | | | |
|---|---|---|---|
| 2,582,416 | 1/1952 | Cornelius | 239—212 XR |
| 2,892,466 | 6/1959 | Stilwell et al | 239—212 XR |
| 3,202,172 | 8/1965 | Bergeron et al. | 137—344 |
| 3,211,382 | 10/1965 | Cornelius et al. | 239—212 |
| 3,318,531 | 5/1967 | Funk | 239—212 |
| 3,339,576 | 9/1967 | Skains | 239—212 XR |

SAMUEL SCOTT, Primary Examiner.

U.S. Cl. X.R.

239—212